Patented June 5, 1945

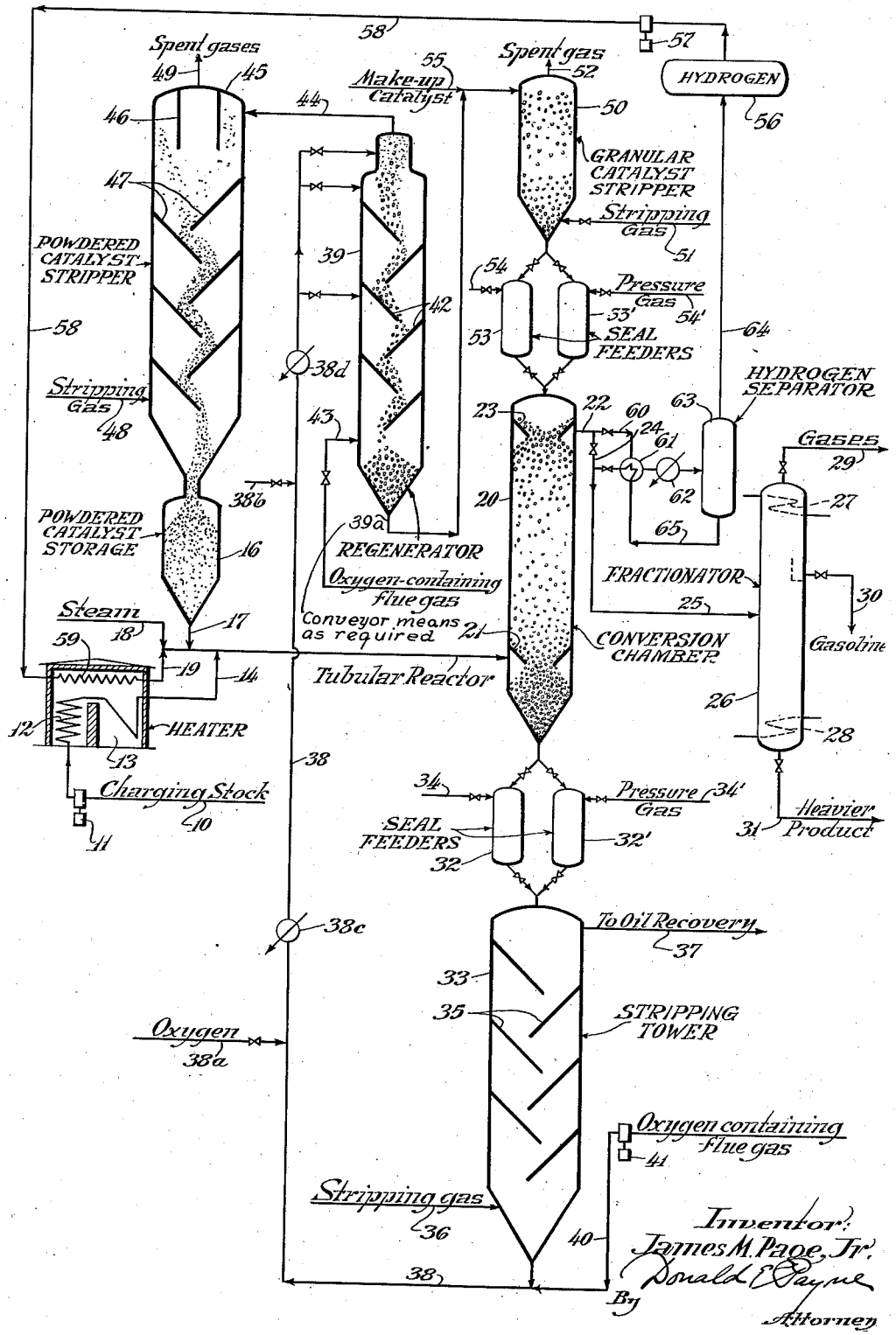

2,377,512

UNITED STATES PATENT OFFICE 2,377,512

METHOD FOR COMBINATION POWDERED-GRANULAR CATALYST HYDROCARBON CONVERSION

James M. Page, Jr., Chicago, Ill., assignor to Standard Oil Company, Chicago, Ill., a corporation of Indiana Application December 19, 1939, Serial No. 310,010

20 Claims. (Cl. 196—52)

This invention relates to the catalytic conversion of hydrocarbons into high quality motor fuel and it pertains particularly to an improved method for effecting conversion by a combination of powdered and granular catalysts.

There are at least three distinct types of systems for effecting catalytic conversion of hydrocarbons: (1) the stationary type which comprises a fixed catalyst bed through which gases or vapors flow; (2) the moving bed type which comprises means for continuously or intermittently introducing and withdrawing catalyst from a reaction chamber during the course of the reaction, and (3) the catalyst suspension type wherein powdered catalyst is carried through the system suspended in the gases of vapors undergoing treatment. Each of these systems is characterized by certain advantages and certain disadvantages, both with respect to cost and facility of operation and with respect to yields and properties of products produced.

One of the chief objections to moving bed catalyst systems is the large amount of catalyst lost as "fines" which inevitably result from the abrasion, crushing, etc. incident to the transfer of catalyst material through the conversion chambers, strippers, regeneration systems, conveyors, etc. Since catalyst material is expensive it is essential for commercial success that catalyst losses be reduced to a minimum.

Suspended catalyst systems employ catalyst material of such fine particle size that considerable difficulty has been encountered in separating the catalyst from reaction products. Furthermore, the suspended catalyst systems are necessarily concurrent in operation and such systems therefore lack the advantages obtainable by countercurrent flow of hydrocarbon vapors and catalyst. An object of my invention is to utilize a combination of moving bed and suspended catalyst systems wherein the disadvantages of both systems will be practically eliminated and the advantages of both systems will be obtained.

A further object of the invention is to obtain a better product distribution than has heretofore been obtainable in catalytic conversion systems used for the production of high quality motor fuel. In catalytic cracking, for instance, it has been found that powdered catalyst operations give a product which contains relatively large amounts of olefins and relatively small amounts of aromatics. Fixed or moving bed systems, on the other hand, tend to produce more aromatics and a lesser amount of unsaturates or olefins. A high olefin content is objectionable because of its tendency to polymerize to form gums, etc. and because of its low susceptibility to anti-knock agents such as lead tetraethyl. Aromatics, particularly benzol, are objectionable in certain fuels such as aviation fuels because of low total heat content. An object of my invention is to produce a motor fuel of good lead tetraethyl susceptibility and of high total heat content. A further object is to produce a balanced motor fuel containing large amounts of iso-paraffins. A still further object is to obtain maximum yields of hydrocarbons in the gasoline boiling range with minimum losses to gas, coke, etc.

In certain reactions, particularly reforming, or aromatization, it is essential to have a relatively large catalyst-to-oil ratio. It is difficult, if not impossible, to obtain this desired ratio in a once-through powdered catalyst system because the oil vapors will not suspend and carry through the reactor the necessary amount of catalyst. An object of my invention is to provide a method for increasing the effective catalyst-to-oil ratio in the powdered catalyst system. A further object is to provide a "soaking" zone in a powdered catalyst process which will permit complete expenditure of the powdered catalyst activity.

A further object of the invention is to utilize a unitary system for employing both granular and powdered catalyst and for simultaneously stripping and regenerating both powdered and granular catalyst while they are associated with each other. A further object is to provide a method whereby either the powdered catalyst or the granular catalyst or both may be only partially regenerated; by leaving a small amount of carbon on the catalyst I may effect savings in the expense of regeneration, i. e. avoid the cost of complete regeneration and at the same time obtain regenerated catalyst of satisfactory activity for one or both stages of the process. A further object is effectively to utilize the fine material resulting from attrition of granular catalyst without the necessity of repelleting.

A further object is to utilize a catalytic conversion system of maximum flexibility, i. e. one in which the character of conversion may be varied over wide ranges depending on the amount and type of granular and powdered catalyst, respectively, and the operating conditions employed for these respective catalysts. For instance, in an aromatization process the dehydrogenation may be effected chiefly by the preliminary contact with powdered catalyst and the olefins thus produced may be cyclicized in the moving bed system. Other objects of the invention will be apparent from the following detailed description.

In practicing my invention a powdered catalyst is suspended in hot hydrocarbon vapors and passed concurrently therewith through a transfer line or primary conversion zone to the base of a moving bed granular catalyst conversion chamber. As the hot vapors together with suspended powdered catalyst pass upwardly through the moving granular catalyst bed the powdered catalyst material is effectively filtered out of the gases and vapors so that the gases leaving the upper part of the granular catalyst conversion chamber are substantially free from catalyst. Occluded oil is then removed from the mixture of spent granular and powdered catalysts and the spent catalysts are simultaneously regenerated in a closed conduit which also acts as a conveyor. This conveyor discharges into a secondary regenerator to complete the regeneration of granular catalyst material and to complete the removal of suspended powdered catalyst therefrom. The powdered catalyst is recovered from regeneration and stripping gases by pneumatic classifying means such as a cyclone separator and after removal of regeneration gases it is re-introduced into the cycle. Similarly, the granular catalyst is freed from regeneration gases and returned to the top of the moving bed conversion system.

Hydrogen may be employed in the conversion step and said hydrogen not only serves to minimize coke deposition but serves to supply additional reaction heat and additional conveying means for the powdered catalyst. Any dust or fines produced by attrition or abrasion as the granular catalyst flows through the system is recovered along with the powdered catalyst and acts as make-up catalyst in this portion of the system. Thus catalyst losses are reduced to a minimum and only very small amounts of make-up granular catalyst are required.

A preferred embodiment of the invention is illustrated in the accompanying drawing which is a schematic flow diagram of the catalytic conversion system.

The invention is applicable to a wide variety of petroleum conversion processes such as cracking, isomerization, reforming, dehydrogenation, aromatization, desulfurization, alkylation, polymerization, etc. Catalysts, charging stocks and operating conditions will necessarily depend on the particular process and the nature of the desired products. Generally speaking, any type of hydrocarbon charging stock may be employed—gases may be dehydrogenated, polymerized, alkylated, etc. Naphthas may be isomerized, dehydrogenated, reformed, aromatized, etc. Gas oils and heavier hydrocarbons may be cracked or destructively hydrogenated and in such reaction many of the other reactions hereinabove enumerated will also take place. The charging stocks may be petroleum or petroleum fractions of any kind or source or oil produced from coal, shale and other organic materials or produced by the hydrogenation of organic materials or produced by synthesis such for example as the carbon monoxide-hydrogen synthesis of the so-called Fischer-Tropsch process. In the preferred examples I will describe the use of an East Texas gas oil for the catalytic cracking and an East Texas naphtha for the catalytic reforming, but it should be understood that oils from any other source may be used as charging stocks.

The nature of the catalyst will, of course, vary with the type of process used. For cracking I prefer to employ catalyst material comprising a metal oxide, i. e. catalysts of the silica-alumina type or of the type wherein metal oxide is deposited on silica. Activated natural clays such as acid treated bentonite (Super Filtrol) is an example of the so-called natural catalysts of the clay type. Synthetic catalysts may be prepared by co-precipitating silica gel with a metal oxide, impregnating silica gel with mineral salts which on drying and heating are converted into metal oxides or hydrolytically adsorbing metal oxides on the silica gel support. The metal oxides deposited on the silica gel or on activated clay may be one or more oxides of such metals as aluminum, magnesium, thorium, titanium, zirconium, beryllium, cerium, copper, nickel, manganese, etc. Such catalysts and their methods of preparation are known to the art and need no further description.

For dehydrogenation, reforming or aromatization I prefer to employ group VI metal oxides mounted on active alumina. About 2% to 6% of molybdenum oxide on alumina or about 5% to 15% of chromium oxide on alumina are highly satisfactory but it should be understood that oxides of tungsten, uranium, vanadium, cerium, etc. may likewise be used. The oxides may be mounted by impregnation or adsorption. Since the specific catalysts and methods of preparing them are well-known no further description thereof is necessary. Bauxite or activated clays may be employed for desulfurization or isomerization. Copper pyro-phosphate or phosphoric acid impregnated on kieselguhr may be employed for polymerization. These and many other catalysts and catalytic mixtures are well-known to those skilled in the art.

The catalyst in my method is used in two distinct forms, a granular form and a powdered form. By the term "granular catalyst" I mean to include not only the granules of fragments of natural or synthetic origin but I also include pellets, extruded masses and particles which have been preformed by any other process. The particle size in the case of granular catalysts may vary considerably but is preferably smaller than quarter inch and larger than 100 mesh, and is fairly uniform, for example about 8 to 14 mesh. The powdered catalyst, as the name implies, is of relatively small particle size, i. e. sufficiently small to permit suspension in a vapor stream of reasonably high velocity. I prefer to employ catalyst sizes below 100 mesh but it will be understood that larger sizes may be employed, depending somewhat upon the nature, physical form and density of the catalyst material itself. A feature of the invention is the pneumatic classification of catalyst which automatically separates the granular from the powdered components; powdered components which are separated pneumatically may, of course, be suspended in oil vapors.

When my invention is utilized for catalytic cracking the gas oil charging stock is introduced through line 10 by pump 11, coils 12 of pipe still 13 and thence by transfer line 14 to tubular reactor 15. Powdered catalyst from storage tank 16 is introduced through line 17 (which may be provided with a suitable pressure feeding mechanism) into tubular reactor 15 and it may be dispersed into the tubular reactor by means of steam or other gas introduced through lines 18 or 19. The vapors and suspended catalyst material in tubular reactor 15 are preferably at a temperature of about 750 to 1050° F., for example about 900° F. and are at a pressure which may range from about atmospheric to 200 pounds per square inch, for example about 25 to 75 pounds per square inch. The velocity of flow through the tubular reactor should be sufficient to maintain the powdered catalyst in suspension and the weight ratio of catalyst to oil should be about 0.5 to 15.0, for example about 2 to 2.5. The time of contact in tubular reactor 15 may range from about 1 to 50 seconds, but is preferably about 10 to 25 seconds.

The gases, vapors, reaction products and suspended catalyst are discharged at the base of moving bed granular catalyst conversion chamber 20, preferably in a space between the wall of said chamber and inverted frustoconical baffle 21. Conversion chamber 20 is maintained substantially full of granular catalyst material which continuously or intermittently moves through the conversion chamber from top to bottom. As the gases and vapors move upwardly against the downwardly moving bed of granular catalyst the powdered catalyst material is effectively filtered out of the hydrocarbon vapor stream so that the gases, vapors and products which are removed from the top of the chamber through line 22 contain no catalyst material. Frusto-conical baffle 23 provides an open space from which vaporous products may be withdrawn.

Conversion chamber 20 is preferably maintained at about the same or slightly lower temperature and pressure than tubular reactor 15 and it should be understood that both the reactor and the chamber should be suitably insulated or if desired provided with heating means. In conversion chamber 20 the gases and vapors pass through the granular catalyst at a space velocity of about 0.1 to 10.0 volumes of charging stock (liquid basis) per volume of catalyst space per hour and the catalyst holding time. i. e., the length of time a given particle of catalyst requires to travel through the conversion chamber, may vary from about 0.2 to 20.0 hours. Certain reactions which were initiated in the tubular reactor are completed in the conversion chamber and certain products which were formed in the tubular reactor (for example, olefins) may be converted into more desirable products (for instance aromatics) in the conversion chamber. The combination of tubular reactor and moving bed catalyst conversion system results in the production of hydrocarbons of high antiknock value, good lead tetraethyl susceptibility, good stability against oxidation, etc. and the combined treatment thereof produces a gasoline of unusually high quality.

The gases and vapors are introduced by line 22 through lines 24 and 25 to a suitable fractionating system 26 which is diagrammatically represented as a tower with a reflux means 27 and reboiler means 28; any conventional system of bubble towers, stabilizers, etc. may be employed for the fractionation step. Gases are withdrawn overhead through line 29, gasoline through line 30 and heavier products through line 31.

The spent catalyst mixture from the base of conversion chamber 20 is alternately withdrawn into one of the sealed feeders 32 and 32', one of said feeders being connected to conversion chamber 20 while the other is discharging into stripping column 33. The alternate feeders are employed because the conversion chamber may be operated at a different pressure than the stripping chamber and it is desirable that gas leakage be prevented between these two chambers. The pressure in feeders 32 and 32' may be controlled by introducing or withdrawing gases therefrom through lines 34 and 34'.

The spent catalyst mixture falls downwardly in stripping column 33 over inclined baffles 35 countercurrent to a hot inert stripping gas such as normally gaseous hydrocarbons, flue gas, steam, etc. introduced at the base of the column through line 36. Column 33 is of relatively large diameter and the flow of stripping gas is sufficiently slow to avoid the carrying away of powdered catalyst through line 37 which leads to a suitable oil recovery system (not shown). Should any powdered catalyst be carried to the oil recovery system it may be separated from the gases or hydrocarbons by filtration, sedimentation or any other conventional means and returned to the system.

During the stripping step the temperature of the mixed powdered and granular materials is preferably maintained above about 750° or 800° F. If the catalyst is cooled to lower temperatures it should be reheated to the kindling point of the carbonaceous material deposited thereon before the regeneration step.

Regeneration of the powdered catalyst and partial regeneration of the granular catalyst is effected in tubular conduit 38 which likewise serves to convey the catalyst material from the stripper to tower 39. A hot flue gas containing small amounts, preferably about 0.5% to 10% of oxygen, is introduced through line 40 by blower 41 and it serves both as a pneumatic conveying means and as a regenerating gas for the spent catalyst. Catalyst material is forced through conduit 38 at a sufficiently high velocity to carry the granular catalyst material as well as the powdered catalyst material to tower 39 and in the course of its flow through this conduit the powdered catalyst may be substantially completely regenerated, i. e. freed from combustible carbonaceous material. Additional oxygen containing gas may be introduced at spaced points 38a, 38b, etc. along conduit 38 which may also be supplied with coolers 38c and 38d. The coolers may heat extraneous fluid such as air, steam, diphenyl, etc. The mixture of granular and powdered catalyst is introduced at high velocity into the top of tower 39. The granular catalyst then drops out of the stream and falls downwardly over inclined baffles 42 countercurrent, if desired, to a stream of additional regenerating gases introduced at the base of tower 39 through line 43. Tower 39 is relatively tall but of narrow cross section and the velocity of gases introduced through line 43 is sufficient to pick up any powdered catalyst and carry it out the line 44 to the top of tower 45 which is provided with a suitable baffle 46 for effecting the separation of powdered catalyst from the supporting gases. Any desired type of pneumatic classifier may be employed for separating the powdered catalyst from the granular catalyst material. I prefer to employ a simple baffled device of the cyclone separator type for separating powdered catalyst from gases and vapors. Instead of completely regenerating the powdered catalyst and partially regenerating the granular catalyst in conduit 38 I may limit the amount of oxygen introduced through lines 40, 38a, etc. to effect only partial regeneration of the powdered catalyst. This expedient is particularly desirable in the case of those catalysts which are initially so extremely active as to cause a degradation of the charging stock when the powdered catalyst is reacted throughout in reactor 15. By leaving a small amount of carbon on the powdered catalyst the initial superactivity may be suppressed and the desired conversion may be obtained in tubular reactor 15 without undue degradation of the charging stock to gases and coke.

Alternatively, the powdered catalyst may be substantially completely regenerated while the granular catalyst is only partially regenerated, i. e. the granular catalyst which is separated from the powdered catalyst may be charged directly to chamber 50 and the regeneration chamber 39 may be unnecessary, pipe 38 leading to a mere separating chamber. This expedient will be useful where the major part of the conversion is effected in reactor 15 and wherein one of the main functions of the granular catalyst bed is to complete the conversion and to separate the powdered catalyst from reaction products.

Powdered catalyst falls downwardly in tower 45 over inclined baffles 47 countercurrent to stripping gas which is introduced at the base of the tower through line 48, the amount of stripping gas being sufficiently small to prevent any resuspension of the catalyst material. By the time the catalyst reaches the base of tower 45 for discharge into catalyst chamber 16 it is substantially freed from oxygen. The regeneration and stripping gases are removed from the top of tower 45 through vent line 49. In those cases wherein the regeneration gases do not contain appreciable amounts of oxygen the step of stripping regenerated catalyst may be unnecessary. In fact, positive advantages may be obtained by avoiding this stripping step, particularly where steam, etc. is used as a stripping agent.

Granular catalyst passes from the base of tower 39 through conduit 39a to the top of catalyst chamber 50. In actual practice tower 39 should be placed above chamber 50, although any suitable conveying means may be employed if such arrangement is not convenient. A stripping gas introduced through line 51 removes the oxygen-containing gases from the granular catalyst, the spent stripping gases being removed through line 52. The regeneration operation may be carried out at temperatures of 950° to 1100° F. but preferably not above 1050° F. and preferably under pressure which serves to lower the kindling temperature and reduce the possibility of overheating the catalyst. A pressure of 50–200 pounds per square inch is recommended.

The granular catalyst which has thus been regenerated and stripped and which is preferably maintained at a temperature of about 900° to 950° F. is then alternately charged to one of the feeders 53 and 53', one of said feeders being connected to chamber 50 while the other is discharging catalyst material into conversion chamber 20. Pressuring gas may be applied through lines 54 and 54' to facilitate the introduction of catalyst from the feeders into the conversion chamber. Makeup catalyst may be introduced from time to time through line 55.

From the above description it will be seen that I have combined a concurrent suspended catalyst system with a preferably countercurrent moving bed catalyst system and obtained the advantages of both while avoiding the outstanding disadvantages of both. The fines produced by attrition and abrasion in the moving bed system are automatically recovered by the pneumatic classification means and utilized along with powdered catalyst. The problem of removing powdered catalyst from reaction products has been eliminated since the powdered catalyst is effectively filtered out of the vapors during their passage through the moving bed of granular catalyst. Occluded oil is removed from both powdered and granular catalyst in one and the same stripping tower 33 and in conveyor 38 I effect regeneration of the powdered catalyst simultaneously with the partial regeneration of granular catalyst. Regeneration of granular catalyst is thus partially effected by concurrent flow in line 38 and partially by countercurrent flow in tower 39. Throughout the regeneration system the catalyst is moved in a stream of gases which efficiently insulate each catalyst particle and prevent the development of hot spots. By this system regeneration temperatures can be easily controlled and they are preferably maintained below about 1200° F. although with certain catalyst regeneration temperatures as high as 1400° F. are tolerable. Hydrogen may be used in the cracking step described above in a manner described below.

When the invention is applied to catalytic reforming or aromatization the flow will be generally similar to that hereinabove described but the reaction conditions will be somewhat changed and will preferably include the presence of added or recycled hydrogen. Thus instead of a gas oil I charge a low-knock rating naphtha through line 10 and heat it to a temperature of about 800 to 1100° F., preferably about 975° F. Hydrogen from storage tank 56 is introduced by compressor 57 and line 58 to coil 59 in furnace 13 and thence through line 19 for assisting in the dispersion of the powdered catalyst material in tubular reactor 15. This reactor may be maintained at low pressures (atmospheric) in the absence of hydrogen but when hydrogen is thus employed I prefer to maintain a pressure of about 50 to 400 pounds per square inch, for example about 200 pounds per square inch. The catalyst-to-oil ratio will be preferably higher than in the case of catalytic cracking and, for example, may be about 1:1 to 100:1. The injection of the hydrogen provides additional carrying means for suspending the catalyst. Hydrogen is preferably employed at the rate of about ½ to 8 mols per mol of charging stock and is preferably heated to a temperature higher than the temperature to which the naphtha is heated in furnace 13, for example 50° to 100° F. or more. The space velocity in reactor 15 in this case should be about 0.1 to 10.0, for example about 1, volumes of liquid oil charged per hour per volume of actual catalyst material in the reactor at any instant. Space velocity is usually defined as the volume of oil per volume of catalyst space per hour and in this instance the catalyst space is the space which would be occupied by the catalyst in the reactor at any instant if that catalyst were allowed to come to rest and settle in the bottom of the reactor.

The reforming or aromatization conditions in chamber 20 will be substantially the same as for catalytic cracking except for the higher pressure and somewhat higher temperature. The reaction products, however, are not passed through line 24 but are withdrawn through line 60, heat exchanger 61 and cooler 62 to hydrogen separator 63 which is preferably operated at about reaction pressure and at a temperature of about 35° to 100° F. Hydrogen from the separator is passed by line 64 to storage tank 56. Liquids from the base of separator 63 are passed by line 65 and heat exchanger 61 to line 25 and fractionating system 26. It should be understood, of course, that the hydrogen need not be pure but may contain 50% or more of hydrocarbon gases. If hydrogen of higher purity is desired suitable scrubbing or purification means may, of course, be employed.

When the invention is thus applied to reforming or aromatization it may take place in two steps, the dehydrogenation being effected in a tubular reactor, the reaction in the tubular reactor 15 being chiefly dehydrogenation and the reaction in chamber 20 being chiefly ring closure or aromatization. In both of the above examples I have described the use of granular and powdered catalyst, respectively, which are of the same composition. It should be understood, however, that I may employ a powdered cracking catalyst and a granular reforming catalyst in which case the charging stock will be chiefly converted into low-boiling hydrocarbons of high olefin content in reactor 15 and will then be largely converted into aromatics in conversion chamber 20. Not only may the nature of the catalysts be different in the powdered and granular systems, respectively, but the relative amounts of the catalyst employed, i. e. catalyst-to-oil ratios, space velocity, etc. may be varied throughout relatively wide ranges as hereinabove noted. This provides an extremely flexible catalytic conversion system which can readily be adapted to the conversion of almost any widely varying charging stocks into high quality motor fuel.

While I have described preferred embodiments of my invention it should be understood that I do not limit myself thereto since many modifications and alternatives of the invention will be apparent to those skilled in the art from the above disclosure.

I claim:

1. The method of converting hydrocarbon charging stocks into high quality motor fuel which comprises vaporizing said charging stocks, suspending powdered catalyst material comprising a metal oxide in the charging stock vapors, and concurrently passing the suspended catalyst and vapors through a reactor, discharging the vapors and catalyst from the reactor into a moving bed of granular catalyst material and separating the reaction products from the catalysts.

2. The method of converting hydrocarbon charging stocks into high quality motor fuel which comprises vaporizing said charging stocks, suspending powdered catalyst material comprising a metal oxide in the charging stock vapors, and concurrently passing the suspended catalyst and vapors through a tubular reactor, discharging the vapors and catalyst from the tubular reactor into a moving bed of granular catalyst material, maintaining a vapor velocity through said granular catalyst material sufficiently low to permit the removal of suspended catalyst from vapors and reaction products and fractionating the vapors and reaction products to obtain hydrocarbons of the motor fuel boiling range.

3. The method of removing suspended powdered catalyst from a stream of vaporized hydrocarbon oil which comprises countercurrently passing said stream through a moving granular catalyst bed at a space velocity of about 0.1 to about 10.0 volumes of oil (liquid basis) per volume of granular catalyst space per hour.

4. The method of utilizing catalyst fines produced in a moving bed granular catalyst system which comprises separating said fines from granular catalyst material, suspending said separated catalyst fines in a stream of hydrocarbon vapors undergoing catalytic conversion and introducing said vapor stream together with its suspended catalyst material into a bed of moving granular catalyst material.

5. The method of converting normally liquid hydrocarbons into a high quality motor fuel which comprises heating said hydrocarbons to a temperature of about 750° to 1100° F., suspending powdered catalyst material in said heated vapors, passing the vapors together with the suspended catalyst concurrently through a tubular reaction zone, introducing the gases, vapors and suspended catalyst from said tubular reaction zone into a bed of granular catalyst material, countercurrently contacting said gases and vapors with said granular catalyst and simultaneously removing suspended catalyst material from gases, vapors and reaction products, and fractionating said gases, vapors and reaction products to recover hydrocarbons of the gasoline boiling range.

6. The method of controlling product distribution in a catalytic hydrocarbon conversion process, which method comprises concurrently contacting hydrocarbon vapors at reaction temperatures with suspended powdered catalyst comprising of metal oxide in an elongated reaction zone, and passing the products from said elongated reaction zone into a moving bed of granular catalyst material maintained at reaction temperature whereby hydrocarbons partially converted in the elongated reaction zone are further converted in the granular catalyst zone.

7. The method of claim 6 wherein granular catalyst comprises an oxide of a metal of the class consisting of molybdenum, chromium, tungsten, and uranium.

8. The method of claim 6 which includes the steps of maintaining both the elongated reaction zone and the granular catalyst bed under a pressure of about 50 to 400 pounds per square inch and introducing about ½ to 8 mols of hydrogen per mol of stock charged to said elongated reaction zone.

9. The method of converting low knock rating liquid hydrocarbons into high knock rating motor fuel which comprises vaporizing said hydrocarbons and heating them to a temperature of about 800° to 1100° F. under a pressure of about 50 to 400 pounds per square inch, separately heating a hydrogen-containing gas to a temperature at least as high as the temperature to which the hydrocarbon vapors are heated and admixing said hydrogen-containing gas with said vapors, suspending powdered catalyst in the mixture of heated gases and vapors and passing the suspended mixture through an elongated reaction zone, introducing the total products and materials from said reaction zone into a moving bed of granular catalyst material, separating powdered catalyst from gases and vapors by means of said granular catalyst material and simultaneously effecting further conversion of hydrocarbons by contact with said granular catalyst material, separating the hydrogen-containing gas from vapors and reaction products leaving said bed of granular catalyst material, recycling at least a part of said gas containing hydrogen to said gas heating step and separating hydrocarbons of the gasoline boiling range from the products of conversion.

10. The method of converting hydrocarbon charging stocks into high quality motor fuel which comprises vaporizing said charging stocks, suspending powdered catalyst material comprising a metal oxide in the charging stock vapors to give a catalyst-to-oil weight ratio within the approximate range of .5:1 to 15:1, concurrently passing the suspended catalyst and vapors through a primary conversion zone at a temperature within the approximate range of 750 to 1050° F., discharging the vapors and catalyst from the primary conversion zone into a moving bed of granular catalyst material at a low point in a moving bed conversion zone, withdrawing vaporous hydrocarbons substantially free from powdered catalyst at an upper point in said moving bed conversion zone and withdrawing granular and powdered catalyst at a point in said moving bed conversion zone which is below the point at which vaporous products are removed therefrom.

11. In a hydrocarbon conversion system wherein powdered catalyst material comprising a metal oxide is employed for converting hydrocarbon charging stock into a high quality motor fuel, the method of operation which method comprises conveying a stream of said powdered catalyst in gaseous suspension through a zone of restricted cross sectional area and thence into the lower part of a substantially vertical zone of large cross sectional area, introducing hot granular material at the top of said substantially vertical zone and removing both powdered catalyst and granular material from the bottom of said substantially vertical zone at such a rate as to maintain a moving bed of granular material in said substantially vertical zone, withdrawing gases substantially free from powdered catalyst at the upper part of said substantially vertical zone, separating material leaving the bottom of said substantially vertical zone into a powdered catalyst fraction and a granular material fraction, returning separated granular material to the top of said substantially vertical zone, resuspending separated powdered catalyst in a gaseous stream and returning said stream to said conversion system.

12. The method of operating a powdered catalyst system which method comprises suspending a powdered catalyst comprising a metal oxide in a gaseous stream of relatively small cross sectional area, introducing said stream at a low point into a substantially vertical moving bed of granular material, removing gases substantially denuded of powdered catalyst from an upper point of said moving bed of granular material, continuously removing both granular material and powdered catalyst from the bottom of said moving bed, separating said removed mixture into a powdered catalyst fraction and a granular material fraction, reintroducing separated granular material at the top of said moving bed at substantially the same rate as granular material is withdrawn from the bottom thereof and returning at least a part of the separated powdered catalyst at a low point in the moving bed while said powdered catalyst is suspended in a gaseous stream.

13. The method of claim 6 in which at least one of the catalysts consists essentially of a siliceous material containing aluminum oxide.

14. The method of claim 6 wherein at least one of the catalysts consists essentially of a siliceous material containing magnesium oxide.

15. The method of claim 10 wherein the catalyst consists essentially of a siliceous material containing aluminum oxide.

16. The method of claim 10 wherein the catalyst consists essentially of a siliceous material containing magnesium oxide.

17. In a process wherein hydrocarbons in a vaporous state are converted into more valuable products while in intimate contact with a finely divided solid catalytic material in the passage of said vapors and catalytic material through a reaction zone, the improvement which comprises passing said vapors and catalytic material after at least partial conversion thereof in said reaction zone through a bed containing catalytic material to trap particles of said catalytic material commingled with said vapors and removing converted hydrocarbon vapors substantially freed from said catalytic material for recovery of valuable products therefrom.

18. In a process wherein hydrocarbons in a vaporous state are converted into more valuable products while in intimate contact with a finely divided solid catalytic material in the passage of said vapors and catalytic material through a reaction zone, the improvement which comprises maintaining a bed of said catalytic material in the path of the vapors undergoing conversion, passing said vapors and catalytic material after at least partial conversion thereof in said reaction zone through said bed of catalytic material to trap particles of said catalytic material commingled with said vapors and removing converted hydrocarbon vapors substantially freed from said catalytic material for recovery of valuable products therefrom.

19. In a process wherein hydrocarbons in a vaporous state are intimately commingled with finely divided catalytic material for continuous passage through a reaction zone to convert said hydrocarbons into more valuable products, the improvement which comprises maintaining a bed of said catalytic material in the path of the vapors undergoing conversion, continuously passing said vapors after at least partial conversion thereof in said reaction zone through said bed of catalytic material to trap particles of catalytic material commingled with said vapors, continuously withdrawing catalytic material from said bed to prevent excessive accumulation thereof by the trapping of catalytic material commingled with said vapors and withdrawing converted hydrocarbons after passing through said bed to recover valuable products therefrom.

20. In a process wherein hydrocarbons in a vaporous state are converted into more valuable products while in intimate contact with a finely divided solid catalytic material, the improvement which comprises passing said vapors and finely divided catalytic material commingled therewith through a bed containing catalytic material to trap particles of said finely divided catalytic material from said vapors and removing converted hydrocarbon vapors substantially freed from said finely divided catalytic material for recovery of valuable products therefrom.

JAMES M. PAGE, Jr.